(12) United States Patent
Abousleman et al.

(10) Patent No.: US 7,327,691 B2
(45) Date of Patent: Feb. 5, 2008

(54) SYSTEM AND METHOD FOR SATELLITE-BASED TRANSMISSION OF VOICE SIGNALS USING AN OTHERWISE DEDICATED WIRELESS CHANNEL

(75) Inventors: Glen P. Abousleman, Scottsdale, AZ (US); Damien W. Budge, Mesa, AZ (US); Visar S. Berisha, Tempe, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 810 days.

(21) Appl. No.: 10/658,435

(22) Filed: Sep. 8, 2003

(65) Prior Publication Data

US 2005/0053100 A1    Mar. 10, 2005

(51) Int. Cl.
*H04J 3/14* (2006.01)
(52) U.S. Cl. .................. 370/248; 370/247; 370/216
(58) Field of Classification Search ................ 370/310, 370/329, 431, 438
See application file for complete search history.

(56) References Cited

U.S. PATENT DOCUMENTS

| | | | |
|---|---|---|---|
| 5,208,804 A | 5/1993 | Wilson et al. | |
| 5,771,229 A | 6/1998 | Gavrilovich | |
| 6,154,489 A * | 11/2000 | Kleider et al. | 375/221 |
| 6,308,079 B1 * | 10/2001 | Pan et al. | 455/519 |
| 6,542,718 B1 * | 4/2003 | Kuo et al. | 455/69 |

* cited by examiner

*Primary Examiner*—Chi Pham
*Assistant Examiner*—Phuc Tran
(74) *Attorney, Agent, or Firm*—Lowell W. Gresham; Jordan M. Meschkow; Charlene R. Jacobsen

(57) ABSTRACT

In a wireless communication system (20) configured for default communication of subsectional signals of a first transmit signal (72/73) over multiple wireless channels (46), a signal selector (82) and method (138) detect an intent to convey a voice signal (86) over one of the wireless channels (46) from a handset (58). The signal selector (82) and method (138) prevent communication of one of the subsectional signals (72A) over the wireless channel (46) for a predetermined interval, and enable a transmission attempt of the voice signal (86). When a complete dialed digits sequence is detected within the time interval, the handset (58) is enabled to utilize the wireless channel. However, when a transmission attempt of the voice signal (86) is unsuccessful or when transmission of the voice signal (86) terminates, the signal selector (82) and method (138) restore default communication of subsectional signals of the first transmit signal (72/73).

19 Claims, 6 Drawing Sheets

| USER - INITIATED OPERATIONS ||||
|---|---|---|---|
| DEFAULT: DATA COMMUNICATION MODE ||||
| | HANDSET CONFIGURATION |||
| | HANDSET DISCONNECTED | HANDSET CONNECTED OFF | HANDSET CONNECTED ON |
| TASKS | TASKS PERFORMED PER CONFIGURATION |||
| PLUG IN HANDSET | √ | — | — |
| CYCLE HANDSET POWER | √ | √ | — |
| ACTUATE DATA DISABLE BUTTON ON IMUX | √ | √ | √ |
| DIAL NUMBER + SEND | √ | √ | √ |
| | ↑ 146 | ↑ 148 | ↑ 150 |

FIG. 6    144

SYSTEM AND METHOD FOR SATELLITE-BASED TRANSMISSION OF VOICE SIGNALS USING AN OTHERWISE DEDICATED WIRELESS CHANNEL

RELATED INVENTION

The present invention is related to "System And Method For Satellite-Based Transmission Of Signals Using Multiple Channels," by Glen P Abousleman, U.S. patent application Ser. No. 10/404,791, filed 1 Apr. 2003, which is incorporated by reference herein.

TECHNICAL FIELD OF THE INVENTION

The present invention relates to the field of wireless communication systems. More specifically, the present invention relates to a system and method for the transmission of voice signals over a satellite-based communication network using an otherwise dedicated wireless channel.

BACKGROUND OF THE INVENTION

Technological advances in recent years have made it easier for individuals and groups in geographically disperse societies to be interconnected through physical travel and communication systems. Major advances in the telecommunications infrastructure have been developed and are continuously evolving to meet the needs of people who regularly travel, communicate, and do business internationally. For example, satellite-based global communication networks have arisen to serve the needs of global travelers and communicators. One such network, first activated in 1998, is the Iridium® commercial system. The Iridium® commercial system is a satellite-based global digital communication network designed to provide wireless communications through hand-held devices located anywhere near or on the surface of the Earth.

FIG. 1 illustrates a highly simplified diagram of a satellite-based communication network 20, dispersed over and surrounding Earth through the use of orbiting satellites 22 occupying orbits 24. Network 20 uses six polar orbits 24, with each orbit 24 having eleven satellites 22 for a total of sixty-six satellites 22. As such, network 20 exemplifies the Iridium® commercial system.

Satellites 22 communicate with radio communication individual subscriber units (ISU's) 26 over subscriber links 28. In addition, satellites 22 communicate with earth terminal/gateway systems 30, which provide access to a public switched telephone network (PSTN) 32 or other communications facilities, over earth links 34. Earth terminal/gateway systems 30 (referred to hereinafter as gateways 30) relay data packets (e.g., relating to calls in progress) between ISU's 26 and the PSTN 32 to other communication devices, such as a wireline telephone 36. Satellites 22 also communicate with other nearby satellites 22 through cross-links 40. For simplicity of illustration, only one each of ISU's 26, gateways 30, and a wireline telephone 36 are shown in FIG. 1.

With the exemplary constellation of sixty-six satellites 22, at least one of satellites 22 is within view of each point on the Earth's surface at all times, resulting in full coverage of the Earth's surface. Any satellite 22 may be in direct or indirect data communication with any ISU 26 or gateway 30 at any time by routing data through the constellation of satellites 22. Accordingly, communication network 20 may establish a communication path for relaying information through the constellation of satellites 22 between any two ISU's 26, or between ISU 26 and gateway 30.

Network 20 may accommodate any number, potentially in the millions, of ISU's 26. Subscriber links 28 encompass a limited portion of the electromagnetic spectrum that is divided into numerous channels, and are preferably combinations of L-Band frequency channels. Subscriber links 28 may encompass one or more broadcast channels 42, that ISU's 26 use for synchronization and message monitoring, and one or more acquisition channels 44 that ISU's 26 use to transmit messages to satellites 22. Broadcast channels 42 and acquisition channels 44 are not dedicated to any one ISU 26 but are shared by all ISU's 26 currently within view of a satellite 22.

Subscriber links 28 also include wireless traffic channels 46, also known as voice channels. Traffic channels 46 are two-way channels that are assigned to particular ISU's 26 from time to time for supporting real-time communications. Each traffic channel 46 has sufficient bandwidth to support a two-way voice communication. For example, each of traffic channels 46 within the Iridium® network are capable of approximately 2.4 kilobits/second (kbps) raw data throughput.

Techniques are being developed to utilize such satellite-based networks to transmit large data files and real-time video, in addition to voice communications. Such a technique is described in the aforementioned related invention, "System And Method For Satellite-Based Transmission Of Signals Using Multiple Channels," U.S. patent application Ser. No. 10/404,791. The technique extends the capability of voice optimized traffic channels, within a wireless communication system, for the transmission of data and video.

Even though the technique enables the transmission of data and video over voice optimized traffic channels, a need has arisen for a system and method for effectively enabling voice signal transmission over data and video transmission. More particularly, due to the real-time nature of voice transmissions, voice signal transmission should supersede the data and/or video in the event of a current transmission of data and/or video.

SUMMARY OF THE INVENTION

Accordingly, it is an advantage of the present invention that a system and method are provided for satellite-based transmission of voice signals using an otherwise dedicated wireless channel.

It is another advantage of the present invention that a system and method are provided efficiently commandeer a wireless channel for transmission of a voice signal.

Another advantage of the present invention is that a system and method are provided that enable a voice signal to supersede current data and/or video signal transmission.

Yet another advantage of the present invention is that implementation of the system and method are transparent to the existing infrastructure of the satellite-based communication network.

The above and other advantages of the present invention are carried out in one form within a wireless communication system configured for default communication of subsectional signals of a first transmit signal over multiple wireless channels, by a method for utilizing one of the multiple wireless channels for transmission of a second transmit signal. The method calls for detecting an intent to convey the second transmit signal over the one of the multiple wireless channels. The method further calls for preventing communication of one of the subsectional signals via the one wireless channel, and enabling a transmission attempt of the second transmit signal in response to the preventing operation.

The above and other advantages of the present invention are carried out in another form within a wireless communication system by an apparatus for selectively utilizing wireless channels. The apparatus includes a first signal source for providing subsectional signals of a first transmit signal and a second signal source for providing a second transmit signal. Transceivers are in default communication with the first signal source, one each of the transceivers supporting one each of the wireless channels for transmitting the subsectional signals over multiple ones of the wireless channels. A signal selector is in communication with each of the first signal source, the second signal source, and one of the transceivers. The signal selector includes a detector element for detecting an intent to convey the second transmit signal over one of the multiple wireless channels. A disable timer is in communication with the detector element for preventing communication of one of the subsectional signals via the one wireless channel for a predetermined time interval. The signal selector further includes an enable element for enabling a transmission attempt of the second transmit signal during the predetermined time interval, the enable element synchronizing an operation of the second signal source with the one of the transceivers.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 6 shows a table of user-initiated operations performed in connection with the voice signal management process.

DETAILED DESCRIPTION OF THE PREFERRED EMBODIMENTS

Figure 1:
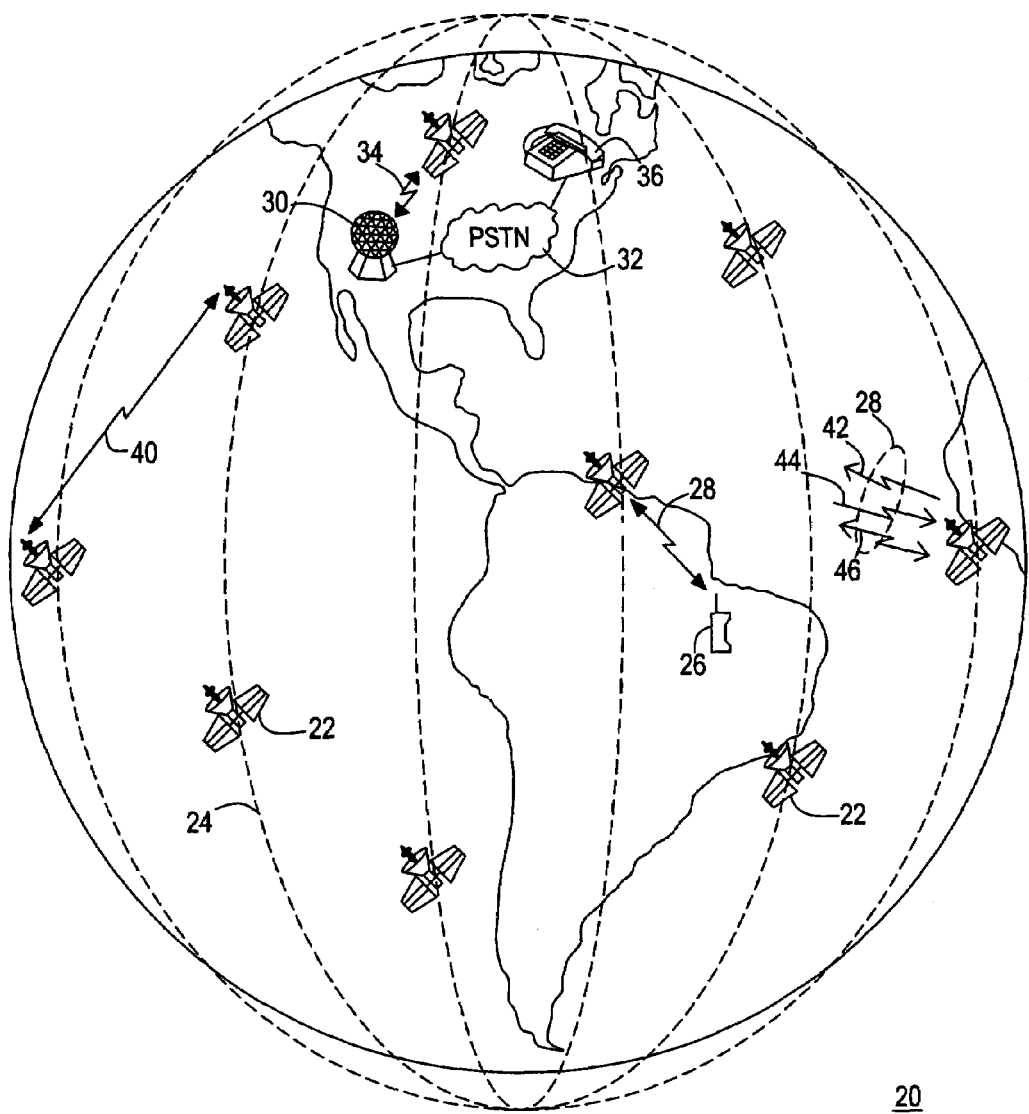
FIG. 1 shows a highly simplified diagram of a satellite-based communication system.
Figure 2:
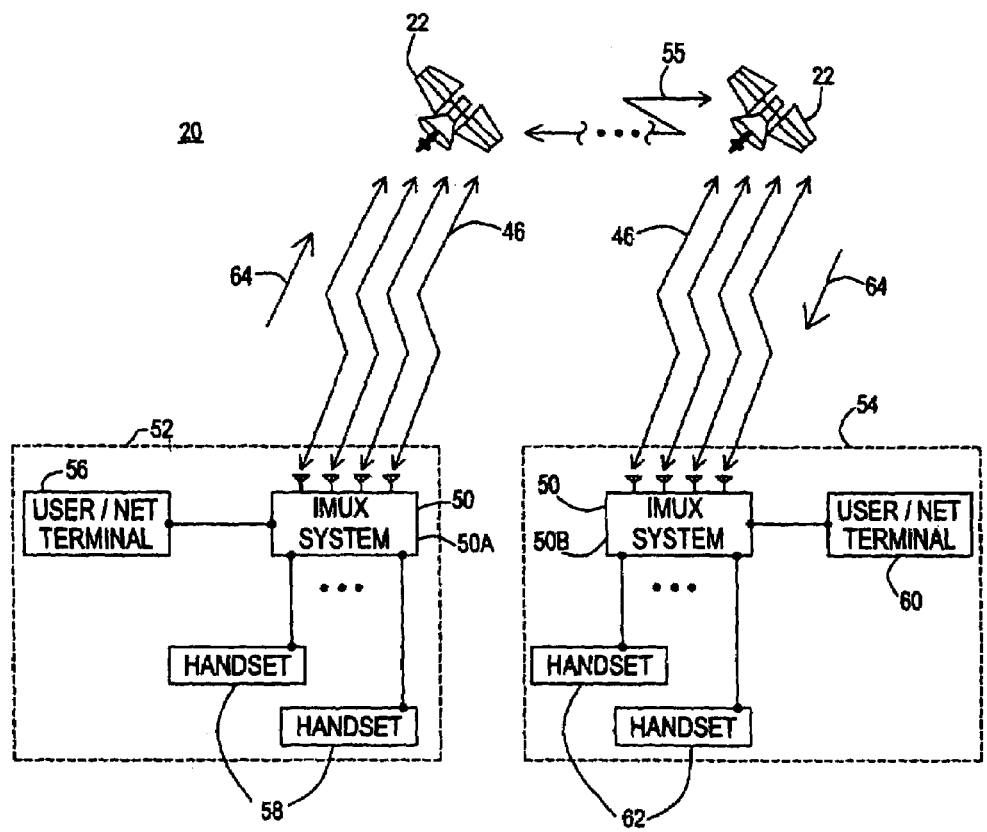
FIG. 2 shows a simplified diagram of a portion of the satellite-based communication system in which an inverse multiplexer (IMUX) system is employed.

Referring to FIGS. 1-2, FIG. 2 shows a simplified diagram of a portion of satellite-based communication network 20 in which inverse multiplexer (IMUX) systems 50 are employed. IMUX systems 50 are adapted for use with a satellite-based communication network, such as network 20, exemplifying the Iridium® commercial system. IMUX systems 50 extend the capability of voice-optimized wireless traffic channels 46, within network 20, for the transmission of data and video, without the addition of terrestrial or airborne network infrastructure. The present invention is adapted for use within IMUX systems 50 for effectively commandeering wireless channels for the transmission of voice signals, even when IMUX systems are currently transmitting data and/or video signals. For clarity of understanding, IMUX systems 50 will be discussed hereinbelow.

Although the present invention is described in terms of its use with the Iridium® commercial system, the present invention is not limited to such a use. Rather, the present invention is applicable to land-based communication systems, as well as to other existing or upcoming satellite-based communication networks. The existing or upcoming satellite-based communication networks may have low-earth or medium-earth orbits, may entail orbits having any angle of inclination (e.g., polar, equatorial or another orbital pattern), and may utilize more or fewer orbits. The present invention is also applicable to satellite constellations where full coverage of the Earth is not achieved (i.e., where there are "holes" in the communications coverage provided by the constellation) and constellations where plural coverage of portions of the Earth occur (i.e., more than one satellite is in view of a point on the Earth's surface). In addition, all gateways 30 and ISUs 26 of network 20 are or may be in data communication with other telephonic devices dispersed throughout the world through PSTN 32 and/or conventional terrestrial cellular telephone devices coupled to the PSTN through conventional terrestrial base stations.

Network 20 includes a first communication station 52 and a second communication station 54. First and second communication stations 52 and 54 may be located on or near the surface of the earth, in isolated or populous areas, and remote from or nearby one another. First and second communication stations 52 and 54, respectively, are deployed in a "mobile-to-mobile" configuration. In the "mobile-to-mobile" configuration, first and second communication stations 52 and 54 are enabled to communicate with one another. But nothing requires stations 52 and 54 to move. The mobile-to-mobile link may be routed through one of gateways 30, which yields an approximate usable data rate of 2.4 kbps for the exemplary Iridium®-based network. Alternatively, the mobile units communicate with one another, completely bypassing one of gateways 30. As a consequence of the mobile-to-mobile configuration, limited gateway modems are freed up for other users, and maximum data throughput is increased from the data rate of 2.4 kbps over each of traffic channels 46 to approximately 3.4 kbps for the exemplary Iridium®-based network.

Alternatively, first communication station 52 and a third communication station (not shown), may be deployed in a "mobile-to-PSTN" configuration. In the "mobile-to-PSTN" configuration, first communication station 52 and the third communication station are enabled to communicate with one another via satellite-based communication network 20 and PSTN 32 infrastructure. An exemplary "mobile-to-PSTN" configuration is discussed in detail in connection with the related invention "System And Method For Satellite-Based Transmission Of Signals Using Multiple Channels," U.S. patent application Ser. No. 10/404,791.

FIG. 2 further depicts a discontinuous bi-directional arrow 55 between satellites 22. This discontinuous arrow 55 indicates that a number of cross-links 40 and satellites 22 may be employed to form the communication path between first communication station 52 and second communication station 54, as known to those skilled in the art. Alternatively, and as known to those skilled in the art, the communication path need not include two or more satellites 22. Rather, the communication path may include only one of satellites 22 with switching taking place at the satellite to another antenna beam.

First communication station 52 includes a first one of IMUX systems 50, referred to hereinafter as first IMUX system 50A. First communication station 52 also includes a first user/net terminal 56 and handsets 58 in communication with first IMUX system 50A. Similarly, second communication station 54 includes a second one of IMUX systems 50, referred to hereinafter as second IMUX system 50B. A second user/net terminal 60 and handsets 62 are in communication with second IMUX system 50B. User/net terminals 56 and 60 represent any of a wide variety of equipment, including any form of computer, telecommunication, and/or input/output device, which may provide or receive data in any of a wide variety of formats. Such equipment include interface devices for coupling stations 52 and/or 54 to a local or wide area network, the Internet, phone lines, and the like.

For simplicity of illustration, the present invention is described in terms of a transmit signal, represented by arrows 64, originating at first IMUX system 50A for transmission toward second IMUX system 50B. However, it should be understood that each of IMUX systems 50 within network 20 functions similarly. For voice transmission, connections need not be between first IMUX system 50A and second IMUX system 50B, but can be between either IMUX system 50A or 50B and any telephone throughout the globe, as facilitated by network 20.

IMUX systems 50 maintain the capability of two-way voice communication provided by network 20, and concurrently facilitate the transmission of large data files and real-time video imagery using network 20. A transmitting one of IMUX systems 50, i.e., first IMUX system 50A, facilitates the transmission of large data files and real-time video imagery by splitting an input data or video signal (discussed below) received via first user/net terminal 56, and transmitting different portions of the data or video signal as transmit signal 64 over separate traffic channels 46. A receiving one of IMUX systems 50, i.e., second IMUX system 50B, combines the different portions of transmit signal 64 to recover the original data or video signal. The net result of such a system is that the effective bandwidth multiplication is directly proportional to the number of traffic channels 46 used.

Figure 3:
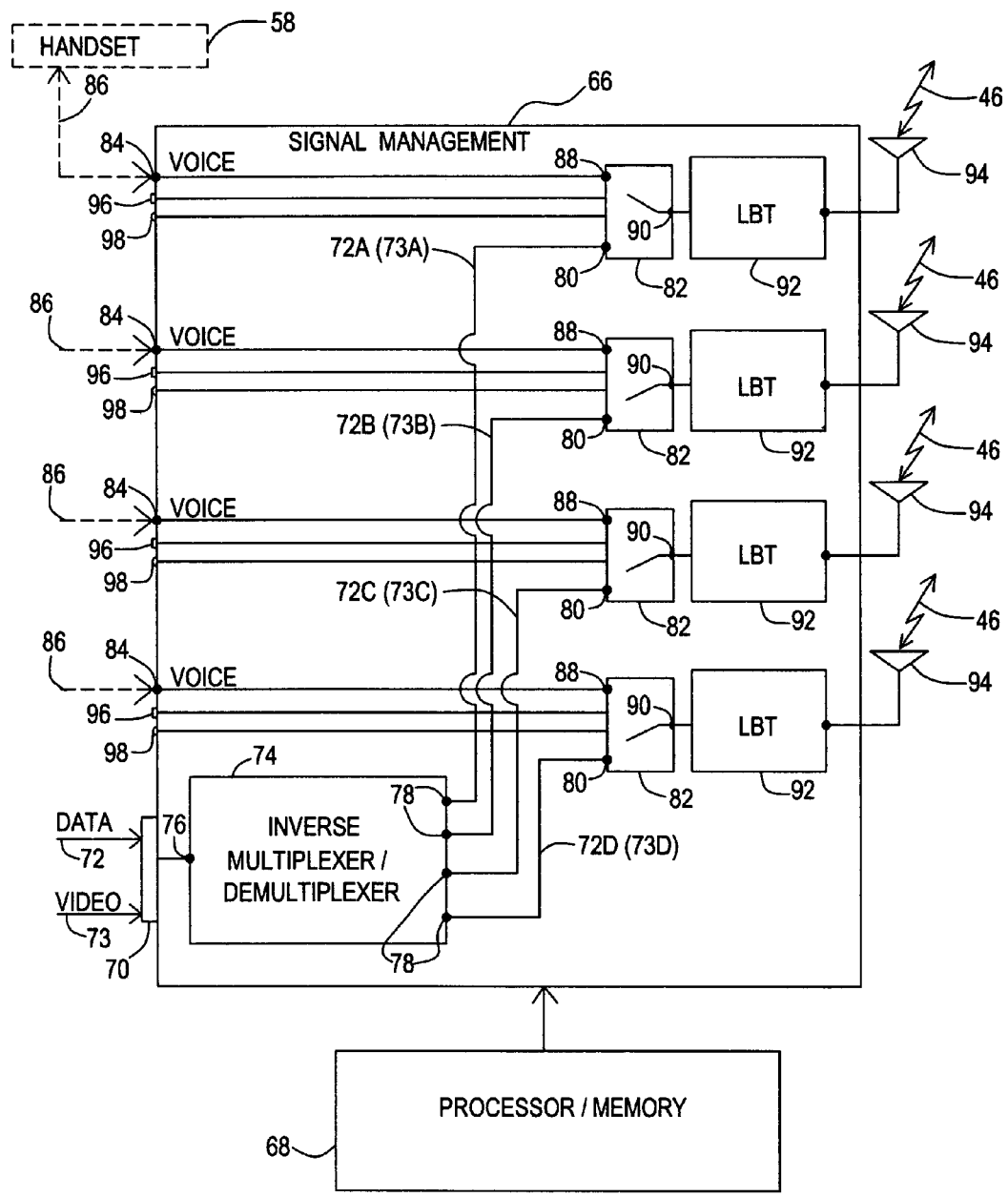
FIG. 3 shows a block diagram of the IMUX system of FIG. 2.

FIG. 3 shows a block diagram of one of IMUX systems 50, i.e., first IMUX system 50A. First IMUX system 50A generally includes a signal management element 66 and a processor/memory element 68 in communication with signal management element 66.

Signal management element 66 includes a data input/output (I/O) port 70 for receiving a data signal 72 and/or a video signal 73 for transmission over network 20 (FIG. 1). Data signal 72 may be a large data file previously generated by and/or collected at first user/net terminal 56. Video signal 73 may be imagery generated at first user/net terminal 56 (FIG. 2) using a multimedia software application, such as that used for videoconferencing. Data I/O port 70 may include one or more receptacles to accommodate, for example, an Ethernet connection, a serial connection, a Universal Serial Bus (USB) connection, and so forth.

An inverse multiplexer/demultiplexer 74 is in communication with data I/O port 70 via an IMUX input 76. IMUX 74 further includes IMUX outputs 78, a number of which corresponds to a number of wireless traffic channels 46 over which first IMUX system 50A is configured to communicate. IMUX 74 may be implemented as an application specific integrated circuit, or may be implemented in a digital signal processor, and is preferably a commercially available device.

In an exemplary embodiment, first IMUX system 50A is a four channel IMUX system 50. Accordingly, inverse multiplexer/demultiplexer 74 includes four IMUX outputs 78, each of which are in communication with four corresponding signal selectors 82, as represented by first inputs 80. Although IMUX system 50A is a four channel IMUX system 50, it should be understood that a different number of channels may be employed within one of IMUX systems 50. In addition, a pair of four channel IMUX systems may be arranged in a master/slave configuration to achieve an eight channel IMUX system. Additionally, N IMUX systems 50 may be connected to one another to provide a 4N channel IMUX system.

Signal management element 66 further includes one or more voice ports 84 for receiving a voice signal 86. In the exemplary four channel embodiment, IMUX system 50 may include four voice ports 84 for accommodating up to four individual voice signals 86 from handsets 58. Hence, the four voice ports 84 are in communication with four corresponding signal selectors 82, as represented by second inputs 88. Signal selectors 82 are in communication with corresponding L-band transceivers 92 (represented by outputs 90), which are in turn, in communication with external antennas 94. A switch 96 and an indicator 98 are associated with each of voice ports 84, and are preferably located on an external panel of IMUX system 50. Switch 96 and indicator 98 will be discussed below in connection with FIG. 4

Processor/memory element 68 controls L-band transceivers 92 and coordinates the flow of data signal 72, video signal 73, and voice signals 86 to and from first IMUX system 50A. As such, processor/memory element 68 is responsive to the detection of data signal 72, video signal 73, and voice signals 86 for controlling the flow of communication over wireless traffic channels 46.

Inverse multiplexing is a process of dividing a high-bandwidth data stream into multiple subsectional signals that can be routed independently through a carrier's network. IMUX 74 functions to split data signal 72 and/or video signal 73 into a number of subsectional signals 72A (73A), 72B (73B), 72C (73C), and 72D (73D) and to process and present subsectional signals 72A (73A), 72B (73B), 72C (73C), and 72D (73D) to first inputs 80 of switches 82. IMUX 74 may also perform error detection and synchronization procedures as required, utilizing methodology known to those skilled in the art.

The number of subsectional signals 72A (73A), 72B (73B), 72C (73C), and 72D (73D) is determined by processor/memory element 68 in response to a number of wireless traffic channels 46 that may be available for transmission of subsectional signals 72A (73A), 72B (73B), 72C (73C), and 72D (73D). Subsectional signals 72A (73A), 72B (73B), 72C (73C), and 72D (73D) are subsequently realigned at the far end, i.e., by another of IMUXs 74 at another of IMUX systems 50, into the original high-bandwidth data signal 72 and/or video signal 73.

Exemplary methodology for splitting data signal 72 and/or video signal 73 into subsectional signals 72A (73A), 72B (73B), 72C (73C), and 72D (73D), and processing and presenting subsectional signals 72A (73A), 72B (73B), 72C (73C), and 72D (73D) to first inputs 80 of signal selectors 82 is discussed in detail in connection with the related invention "System And Method For Satellite-Based Transmission Of Signals Using Multiple Channels," U.S. patent application Ser. No. 10/404,791. However, the present invention need not be limited to such methodology. Rather, other existing or upcoming inverse multiplexing systems that split a first transmit signal into multiple subsectional signals may alternatively be employed. Consequently, for purposes of the present invention, the utilized inverse multiplexer system, such as the exemplary IMUX 74, is referred to hereinafter as a first signal source 74 relative to signal selectors 82. Each of handsets 58 may be considered a second signal source relative to signal selectors 82 to distinguish them from first signal source 74. However, the nomenclature "handsets" will continue to be used throughout the following discussion.

Figure 4:
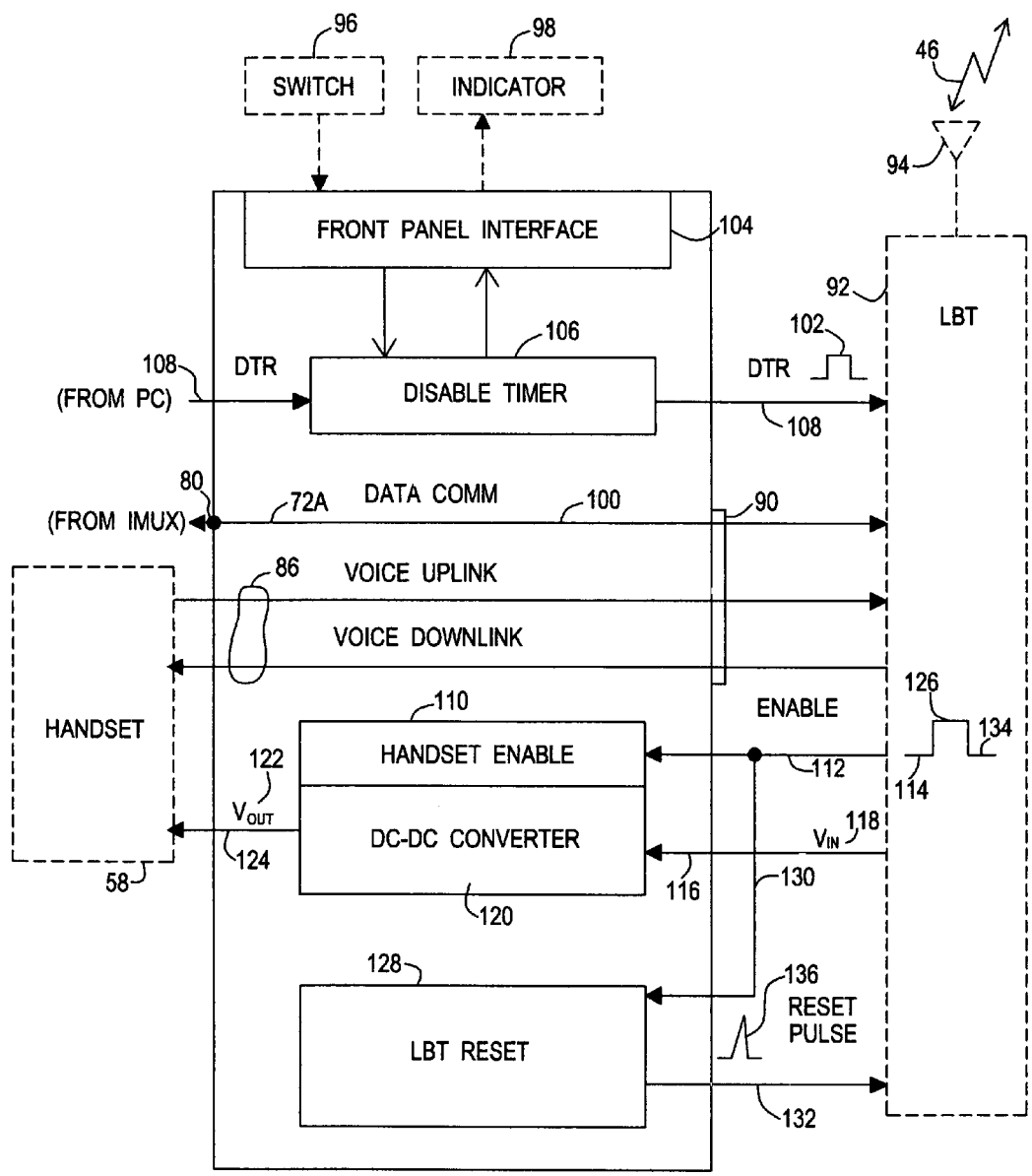
FIG. 4 shows a block diagram of a signal selector employed within the IMUX system in accordance with a preferred embodiment of the present invention.

FIG. 4 shows a block diagram of one of signal selectors 82 employed within IMUX system 50 (FIG. 3) in accordance with a preferred embodiment of the present invention. Although only one of signal selectors 82 is shown, the following discussion applies to the other signal selectors 82 of IMUX system 50 (FIG. 3) as well. Signal selector 82 is in selective communication with first signal source 74, handset 58, and one of L-band transceivers 92. Signal selector 82 enables the transmission of voice signal 86 over an otherwise dedicated traffic channel 46. In particular, signal selector 82 enables the transmission of voice signal 86 to supercede the transmission of one of subsectional signals 72A (73A), 72B (73B), 72C (73C), and 72D (73D). In this exemplary illustration, the transmission of voice signal 86, i.e. a voice call, can supersede the transmission of subsectional signal 72A, i.e., a transmission of a data file. However, subsectional signal need not be a data file transmission, but may instead by a video transmission, i.e., subsectional signal 73A.

In a preferred embodiment, signal selector 82 is configured to communicate subsectional signal 72A of data signal 72 (i.e., a first transmit signal) over traffic channel 46. That is, traffic channel 46 is nominally dedicated to the transmission of subsectional signal 72A, whether or not subsectional signal 72A is present at first input 80. This nominal configuration of signal selector 82 is represented by a signal pass-through 100. In addition, a data terminal ready (DTR) signal 102 is provided via processor (PC) 68 to L-band transceiver 92 so that first signal source 74 is enabled to utilize L-band transceiver 92 to transmit subsectional signal 72A.

In general, signal selector 82 includes a detector, in the form of a front panel interface circuit 104, for detecting an intent to convey voice signal 86 over traffic channel 46 supported by L-band transceiver 92. By way of example, front panel interface circuit 104 may detect a user-initiated actuation of switch 96 that signals and intent to convey voice signal 86.

A disable timer 106 is in communication with front panel interface circuit 104. In addition, disable timer 106 is interposed in a signal path 108 of DTR signal 102. In response to the detection of the intent to convey voice signal 86, disable timer 106 functions to interrupt signal pass-through 100 so that wireless channel 46 may be seized for the transmission of voice signal 86. Additionally, even while IMUX system 50 (FIG. 3) is currently transferring subsectional signal 72A, the transmission of subsectional signal 72A will be dropped in favor of voice signal 86. Related invention "System And Method For Satellite-Based Transmission Of Signals Using Multiple Channels," U.S. patent application Ser. No. 10/404,791, describes methodology for managing the transmission of first transmit signal 72 over the remaining ones of multiple traffic channels 46.

This interrupt is created by utilizing DTR signal 102 to drop the data call, i.e. interrupt transmission of subsectional signal 72A via signal pass-through 100. The disable timer 106 further provides a window of opportunity, i.e., a predetermined time interval, to dial a phone number at handset 58 and establish the transmission of voice signal 86, i.e., a voice call. Should the predetermined time interval expire prior to establishing transmission of voice signal 86, traffic channel 46 is seized again for the transmission of subsectional signal 72A. Disable timer 106 may be implemented in either hardware or software.

A hardware implementation of disable timer 106 may include, for example, a 555-timer circuit whose primary components are a pulse generator and toggle circuitry. Disable timer 106 is started when a user actuates switch 98, which produces a timed pulse that transitions DTR signal 102 from a HIGH to a LOW state. By toggling this DTR signal 102 from HIGH to LOW, transmission of subsectional signal 72A via signal pass-through 100 is dropped. As long as DTR signal 102 is held LOW, the transmission of subsectional signal 72A cannot be restored thereby providing a time interval for establishing the transmission of voice signal 86. In an exemplary embodiment, the pulse generator produces a two minute pulse during which DTR signal 102 is held LOW.

The toggle of DTR signal 102 from HIGH to LOW can be accomplished by either logic circuitry or a mechanical relay. With the use of logic data, an RS-232 signal (+/−15V) is reduced to TTL logic voltage levels (0 and +5V). This signal is then combined with the signal of the timer circuit and the desired output is boosted to RS-232 voltage levels and passed to L-band transceiver 92 via signal path 108.

With the use of a mechanical relay, when disable timer 106 is enabled, the relay disconnects the DTR pin and connects it to a LOW logic level thereby dropping the transmission of subsectional signal 72A. While DTR signal 102 is held low, indicator 98 illuminates or otherwise indicates that data transmission capability is disabled and voice signal transmission is currently enabled.

By way of another example, a software implementation of disable timer 106 may be employed. When switch 96 is actuated, an application being executed by processor 68 (FIG. 3) can delay a redial attempt restoration of the transmission of subsectional signal 72A to provide a time interval during which transmission of voice signal 86 can be established. Yet another method that may be used to interrupt transmission of subsectional signal 72A is by using a simple push button switch to momentarily toggle DTR signal 102 from HIGH to LOW.

Signal selector 82 further includes a handset enable element 110 for enabling a transmission attempt of voice signal 86 during the predetermined time interval, i.e., the two minute duration set by disable timer 106. In a preferred embodiment, L-band transceiver 92 is an Iridium® 9522 L-Band Transceiver (LBT). Handset 58 utilizes L-band transceiver 92 to access traffic channel 46, and receives its power via L-band transceiver 92. Handset enable element 110 provides synchronization and power at an appropriate voltage, for example, the twelve volts necessary to power handset 58.

Accordingly, an enable link 112 is coupled between handset enable element 110 and L-band transceiver 92. Enable link 112 conveys an enable logic signal (ENABLE) 114, provided by L-band transceiver 92, to handset enable element 110. Similarly, an input power link 116 is coupled between handset enable element 110 and L-band transceiver 92. Input power link 116 conveys power at a first voltage ($V_{IN}$) 118, provided by L-band transceiver 92, to handset enable element 110.

A DC-DC converter 120 portion of handset enable element 110 converts the power at first voltage ($V_{IN}$) 118 to a second voltage ($V_{OUT}$) 122. An output power link 124 subsequently conveys power at second voltage ($V_{OUT}$) 122 to handset 58 coupled to IMUX 50 (FIG. 3) via the corresponding voice port 84 (FIG. 3).

Handset 58 desirably operates utilizing a 12 VDC power supply synchronized to a high state 126 if ENABLE signal 114. Thus, power at second voltage 122 is combined with ENABLE signal 114 into a single signal input and provided to handset 58 via output power link 124. That is, when ENABLE signal 114 is in high state 126, DC-DC converter 120 is enabled to convert the received power at first voltage 118, for example, 5 VDC, to second voltage 122, for example, 12 VDC.

Signal selector 82 additionally includes a reset circuit (LBT RESET) 128 in communication with L-band transceiver 92. In particular, a second enable link 130 is in communication with each of enable link 112 and reset circuit 128. Second enable link 130 conveys ENABLE signal 114, provided by L-band transceiver 92, to reset circuit 128. In addition, a reset link 132 is in communication with each of reset circuit 128 and L-band transceiver 92.

In an exemplary scenario, when handset 58 is unplugged from voice port 84, L-band transceiver 92 powers down, and ENABLE signal 114 is set to a low state 134. In a preferred embodiment, IMUX system 50 (FIG. 3) should be in a continuously ready state for transmitting subsectional signals 72A (73A), 72B (73B), 72C (73C), and 72D (73D). Accordingly, when L-band transceiver 92 powers down, subsectional signal 72A cannot be transmitted over traffic channel 46, until L-band transceiver 92 is powered on.

Reset circuit 128 is a negative edge triggered timer that detects when ENABLE signal 114 is in low state 134 and outputs a short reset pulse 136 over reset link 132 to L-band transceiver 92. This short reset pulse 136 alternates the current OFF state of L-band transceiver to an ON state.

Figure 5:
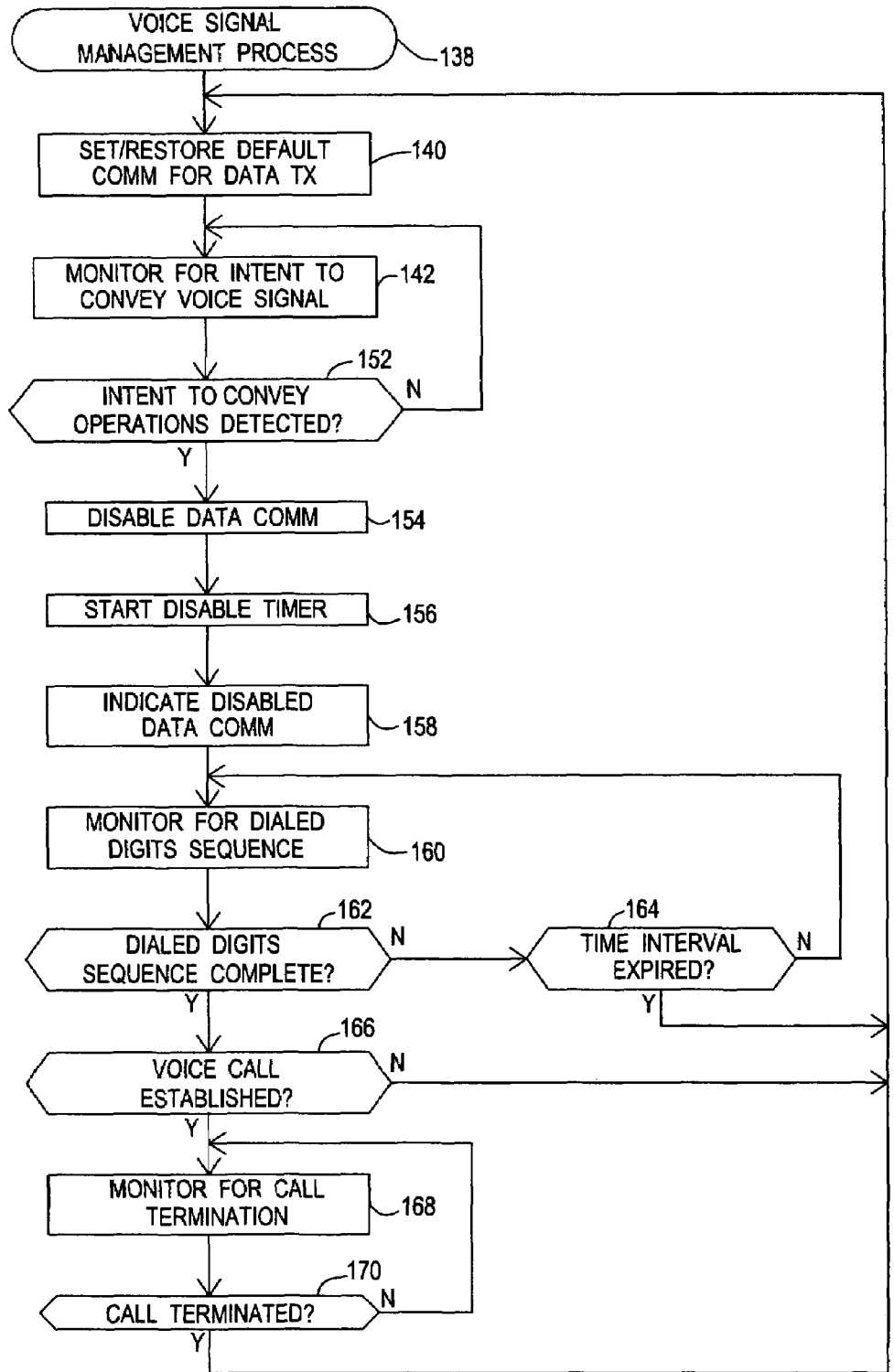
FIG. 5 shows a flow chart of a voice signal management process performed in connection with the signal selector of FIG. 4.

Referring to FIGS. 4-5, FIG. 5 shows a flow chart of a voice signal management process 138 performed in connection with signal selector 82. Process 138 enables the utilization of one of wireless voice traffic channels 46 that is otherwise dedicated to the transmission of subsectional signal 72A. Although process 138 is described in connection with signal selector 82 of FIG. 4, it should be readily appreciated that process 138 applies equally to each of signal selectors 82 of IMUX system 50.

Process 138 begins at a task 140. During a first iteration of task 140, IMUX system 50 (FIG. 3) is configured for default communication of data signal 72 and/or video signal 73 (i.e., a first transmit signal) as subsectional signals 72A (73A), 72B (73B), 72C (73C), and 72D (73D). That is, IMUX system 50 is powered up, L-band transceiver 92 is powered up, and signal selector 82 enables the transmission of subsectional signal 72A over traffic channel 46.

Following task 140, a task 142 is performed. Task 142 monitors for an intent to convey voice signal 86. The intent to convey is a user-initiated sequence of events that depend upon the current configuration of IMUX system 50 and handset 58.

Referring to FIG. 6 in connection with task 142, FIG. 6 shows a table 144 of user-initiated operations performed in connection with the voice signal management process 138. As discussed previously, signal selector 82 is configured for default communication of subsectional signal 72A. Handset 58 may be in one of three configurations relative to IMUX system 50. These configurations include a first scenario 146 in which handset 58 is disconnected from voice port 84 (FIG. 3) of IMUX system, a second scenario 148 in which handset 58 is connected to voice port 84 and handset 58 is currently powered off, and a third scenario 150 in which handset 58 is connected to voice port 84 and handset 58 is currently powered on.

In first scenario 146, an intent to convey voice signal 46 entails the detection of handset 58 being plugged into voice port 84, power being cycled on handset 58, and a user-initiated actuation of switch 96 (FIG. 3) to disable the transmission of subsectional signal 72A for the predetermined time interval. In second scenario 148, the intent to convey voice signal 46 entails the detection of power being cycled on handset 58 and a user-initiated actuation of switch 96. In third scenario 150, the intent to convey voice signal 46 merely entails the detection of a user-initiated actuation of switch 96.

Referring back to voice signal management process 138 (FIG. 5), in response to task 142, a query task 152 determines whether an intent to convey voice signal 86 is detected. When none of the above intent to convey operations are detected, process 138 loops back to task 142 for continued monitoring of an intent to convey voice signal 86. Alternatively, when one of the series of intent to convey operations are detected, ending with the user-initiated actuation of switch 96, process 138 proceeds to a task 154.

At task 154, any communication of subsectional signal 72A is interrupted. In particular, the actuation of switch 96 produces a timed pulse that transitions DTR signal 102 from a HIGH to a LOW state, thus interrupting any transmission of subsectional signal 72A via signal pass-through 100.

A task 156, performed in connection with task 154, starts the disable timer. In the configuration of signal selector 82 described above, as long as DTR signal 102 is held LOW, the transmission of subsectional signal 72A cannot be restored thereby providing a time interval for establishing the transmission of voice signal 86. In an exemplary embodiment, the timed pulse may be approximately two minutes during which DTR signal 102 is held LOW.

A task 158 performed in conjunction with tasks 154 and 156 indicates the interruption of data communication. That is, indicator 98 illuminates, or otherwise signals a user that signal selector 82 is currently configured to enable establishment of the transmission of voice signal 86 (i.e., a second transmit signal).

Next, a task 160 monitors for a dialed digits sequence. This dialed digits sequence is typically a phone number entered at handset 58 for an intended recipient, followed by actuation of a SEND key. Referring to table 144 (FIG. 6) momentarily, each of first, second, and third user-initiated scenarios entails entering a number and actuating a SEND key following the actuation of switch 98 (FIG. 3).

With reference back to FIG. 6, a query task 162 is performed in connection with monitoring task 160. Query task 162 determines whether a complete dialed digits sequence has been detected. In other words, query task 162 determines whether a phone number is entered and the SEND key is actuated. When query task 162 determines that the dialed digits sequence is incomplete, process 138 proceeds to a query task 164.

Query task 164 determines whether the predetermined time interval, for example, two minutes has expired. When the predetermined time interval has not expired, indicating a continued window of opportunity for completing the dialed digits sequence, process 138 loops back to task 160 for continued monitoring of a completed dialed digits sequence.

However, when query task 164 determines that the time interval has expired, process 138 loops back to task 140 so that default communication for transmission of subsectional signal 72A is restored. In the configuration of signal selector 82 described above, the predetermined time interval expires when the timed pulse drops low. This expiration of the timed pulse causes DTR signal 102 to transition from the LOW state to the HIGH state, thus restoring the ability to transmit subsectional signal 72A over traffic channel 46.

Referring back to query task 162, when query task 162 determines that the dialed digits sequence is complete, process 138 proceeds to a query task 166. Query task 166 determines whether a voice call is established. That is, query task 166 determines whether L-band transceiver 92 is currently seized for transmission of voice signal 86. When L-band transceiver 92 is not currently busy transmitting voice signal 86, process 138 loops back to task 140 so that default communication for transmission of subsectional signal 72A is restored, as discussed above. L-band transceiver 92 may not be seized if completion of the dialed digits sequence did not yield a successful connection between handset 58 and the intended recipient. As such, L-band transceiver 92 is relinquished for an attempted transmission of voice signal 86 and default communication is restored for a possible transmission of subsectional signal 72A.

However, when query task 166 determines whether L-band transceiver 92 is currently seized for transmission of voice signal 86, process 138 proceeds to a task 168. Task 168 monitors for call termination. That is, task 168 monitors for the conventional circuit switching channel release mechanisms performed at IMUX system 50 (FIG. 3).

A query task 170 is performed in connection with task 168. Query task 170 determines whether the voice call, i.e., the transmission of voice signal 86, has been terminated and traffic channel 46 has been released per conventional mechanisms. When the transmission of voice signal 86 has not been terminated, process 138 loops back to monitoring task 168.

However, when transmission of voice signal 86 has been terminated, process 138 loops back to task 140 so that default communication for transmission of subsectional signal 72A is restored, as discussed above, and first transmit source 74 is once again permitted to transmit subsectional signal 72A over wireless traffic channel 46. Thus, voice signal management process 138 describes the function of signal selector 82 for efficiently commandeering a wireless traffic channel for the transmission of voice signal 86.

In summary, the present invention teaches of a signal selector and a method for satellite-based transmission of voice signals using an otherwise dedicated wireless channel. The signal selector and method enable default communication of data and/or video from a first signal source. The first signal source facilitates the transmission of large data files and real-time video imagery over low-data-rate wireless channels optimized for voice communication by inverse multiplexing an input transmit signal, and transmitting different portions of the data or video signal over separate wireless traffic channels as subsectional signals. However, the signal selector incorporated into the IMUX system, efficiently commandeers a wireless channel for transmission of a voice signal by interrupting the default communication of data and/or video for a predetermined time interval and allowing a transmission attempt from the handset. When a voice call transmission attempt is unsuccessful or when a voice call is terminated, the signal selector and method automatically restore the IMUX system to default communication of data and/or video supplied as subsectional signals from the inverse multiplexer. Accordingly, the IMUX system and method facilitate bandwidth-expandable communications capability for the transmission of voice, video, and data without the need for additional terrestrial or airborne infrastructure to the existing infrastructure of the satellite-based communication network.

Although the preferred embodiments of the invention have been illustrated and described in detail, it will be readily apparent to those skilled in the art that various modifications may be made therein without departing from the spirit of the invention or from the scope of the appended claims. For example, transmit signals exhibiting different data types than those specified may be transmitted via the present invention.

What is claimed is:

1. In a wireless communication system configured for default communication of subsectional signals of a first transmit signal over multiple wireless channels, a method for utilizing one of said multiple wireless channels for transmission of a second transmit signal, said method comprising:
   detecting an intent to convey said second transmit signal over said one of said multiple wireless channels;
   preventing communication of one of said subsectional signals via said one wireless channel;
   enabling a transmission attempt of said second transmit signal in response to said preventing operation; and
   establishing transmission of said second transmit signal over said one wireless channel when said transmission attempt is successful.

2. A method as claimed in claim 1 further comprising:
   determining termination of transmission of said second transmit signal; and
   permitting, in response to said determining operation, communication of said one of said subsectional signals via said one wireless channel.

3. A method as claimed in claim 1 wherein said subsectional signals of said first transmit signal are provided by a signal source, said second transmit signal originates from a handset, a transceiver is in selective communication with said handset and said signal source, and said method further comprises synchronizing an operation of said handset with said transceiver in response to said detecting operation.

4. A method as claimed in claim 3 wherein said transceiver is configured to provide power at a first voltage, and said synchronizing operation comprises:
   converting said power to a second voltage; and
   providing said power at said second voltage to said handset in synchronization with a high state of a transceiver provided logic signal.

5. A method as claimed in claim 3 comprising:
   detecting a disconnect between said handset and said transceiver; and
   restoring communication of said one of said subsectional signals over said one wireless channel.

6. A method as claimed in claim 1 wherein said second transmit signal originates from a handset, and said method further comprises:
   establishing a predetermined time interval during which said preventing operation occurs; and
   when a complete dialed digits sequence is detected from said handset within said predetermined time interval, said enabling operation enables said handset to utilize said one wireless channel.

7. A method as claimed in claim 6 wherein said subsectional signals of said first transmit signal are provided by a signal source, and said method further comprises enabling said signal source to utilize said one wireless channel when said dialed digits sequence is incomplete upon expiration of said predetermined time interval.

8. A method as claimed in claim 1 further comprising indicating, in response to said preventing operation, that said one wireless channel is being prevented from communicating said one of said subsectional signals.

9. A method as claimed in claim 1 wherein said wireless communication system is a satellite-based communication network and said wireless channels are wireless voice channels managed by said satellite-based communication network.

10. A method as claimed in claim 1 wherein said second transmit signal is a voice signal.

11. In a wireless communication system, an apparatus for selectively utilizing wireless channels, said apparatus comprising:
a first signal source for providing subsectional signals of a first transmit signal;
a second signal source for providing a second transmit signal;
transceivers in default communication with said first signal source, one each of said transceivers supporting one each of said wireless channels for transmitting said subsectional signals over multiple ones of said wireless channels; and
a signal selector in selective communication with each of said first signal source, said second signal source, and one of said transceivers, said signal selector comprising:
a detector element for detecting an intent to convey said second transmit signal over one of said multiple wireless channels;
a disable timer in communication with said detector element for preventing communication of one of said subsectional signals via said one wireless channel for a predetermined time interval; and
an enable element for enabling a transmission attempt of said second transmit signal during said predetermined time interval, said enable element synchronizing an operation of said second signal source with said one of said transceivers.

12. An apparatus as claimed in claim 11 wherein said detector element is a user-activated switch.

13. An apparatus as claimed in claim 11 wherein:
said second signal source is a handset;
when a complete dialed digits sequence is detected from said handset within said predetermined time interval, said signal selector enables said handset to utilize said one of said transceivers for transmission of said second transmit signal over said one wireless channel; and
when said dialed digits sequence is incomplete upon expiration of said predetermined time interval, said default communication between said one of said transceivers and said first signal source is restored.

14. An apparatus as claimed in claim 11 wherein:
said one of said transceivers provides power at a first voltage; and
said enable element comprises a converter and an output in communication with said converter, said converter receiving said power at said first voltage and converting said power to a second voltage, and said output being in communication with said second signal source and providing said power at said second voltage to said second signal source in synchronization with a high state of a transceiver provided logic signal.

15. An apparatus as claimed in claim 11 wherein said signal selector further includes a reset circuit in communication with said one of said transceivers, said reset circuit restoring said default communication between said first signal source and said one of said transceivers upon detecting a disconnect between said handset and said one of said transceivers.

16. An apparatus as claimed in claim 11 further comprising a user indicator in communication with said disable timer, said user indicator indicating that said one transceiver supporting said one wireless channel is being prevented from communicating said one of said subsectional signals.

17. In a satellite-based communication network configured for default communication of subsectional signals of a first transmit signal provided by a signal source over multiple wireless voice channels, a method for utilizing one of said multiple wireless voice channels for transmission of a voice signal originated from a handset, said method comprising:
detecting, from said handset, an intent to convey said voice signal over said one of said multiple wireless voice channels;
preventing said signal source from communicating one of said subsectional signals via said one wireless voice channel;
establishing a predetermined time interval during which said preventing operation occurs;
indicating, in response to said preventing operation, that said one wireless voice channel is being prevented from communicating said one of said subsectional signals;
when a complete dialed digit sequence is detected from said handset within said predetermined time interval, enabling a transmission attempt of said voice signal; and
synchronizing an operation of said handset with said transceiver.

18. A method as claimed in claim 17 further comprising enabling said signal source to utilize said one wireless channel when said dialed digits sequence is incomplete upon expiration of said predetermined time interval.

19. A method as claimed in claim 17 further comprising:
determining termination of transmission of said voice signal; and
permitting, in response to said determining operation, communication of said one of said subsectional signals via said one wireless channel.

* * * * *